United States Patent
Wu et al.

(10) Patent No.: US 7,651,546 B2
(45) Date of Patent: Jan. 26, 2010

(54) METHOD AND APPARATUS FOR MANUFACTURING HIGH-PURITY HYDROGEN STORAGE ALLOY $Mg_2Ni$

(75) Inventors: Yuan-Pang Wu, Longtan Township, Taoyuan County (TW); Hui-Yun Bor, Longtan Township, Taoyuan County (TW); Rong-Ruey Jeng, Longtan Township, Taoyuan County (TW)

(73) Assignee: Chung Shan Institute of Science and Technology, Armaments Bureau, M.N.D., Taoyuan County (TW)

( * ) Notice: Subject to any disclaimer, the term of this patent is extended or adjusted under 35 U.S.C. 154(b) by 37 days.

(21) Appl. No.: 11/976,220

(22) Filed: Oct. 23, 2007

(65) Prior Publication Data
US 2009/0100968 A1 Apr. 23, 2009

(51) Int. Cl.
*C22B 26/22* (2006.01)
(52) U.S. Cl. ............... 75/330; 75/604; 420/590; 420/900
(58) Field of Classification Search ........ 420/590, 420/900; 75/330, 604
See application file for complete search history.

(56) References Cited

U.S. PATENT DOCUMENTS

| 3,552,951 | A | * | 1/1971 | Schelleng | 420/441 |
| 5,858,132 | A | * | 1/1999 | Bell et al. | 148/441 |
| 2007/0295618 | A1 | * | 12/2007 | Boyd et al. | 206/0.7 |

FOREIGN PATENT DOCUMENTS

JP 2001226722 A * 8/2001

* cited by examiner

*Primary Examiner*—George Wyszomierski
*Assistant Examiner*—Tima M McGuthry-Banks
(74) *Attorney, Agent, or Firm*—Rosenberg, Klein & Lee

(57) ABSTRACT

The present invention provides a method for manufacturing high-purity hydrogen storage alloy $Mg_2Ni$ applicable to industry and capable of manufacturing continuously. First, raw materials of magnesium-nickel with weight percentage of nickel between 23.5 and 50.2 are heated, melt, and mixed uniformly. Cool the magnesium-nickel liquid and control the temperature to be above the solidification temperature and below the liquification temperature in the phase diagram of magnesium-nickel. By making advantage of segregation principle in phase diagrams, solid-state high-purity γ-phase $Mg_2Ni$ hydrogen storage alloy is given. Then high-purity γ-phase $Mg_2Ni$ hydrogen storage alloy with atomic ratio of 2:1, no other phases, and with excellent hydrogen absorption-desorption dynamics is given.

8 Claims, 8 Drawing Sheets

METHOD AND APPARATUS FOR MANUFACTURING HIGH-PURITY HYDROGEN STORAGE ALLOY MG$_2$NI

FIELD OF THE INVENTION

The present invention relates generally to a hydrogen storage technology for new energies, and particularly to a method and apparatus for manufacturing high-purity hydrogen storage alloy Mg$_2$Ni.

BACKGROUND OF THE INVENTION

Owing to substantial growth of usage in fossil energy while which energy is drying up gradually, to pernicious substances harmful to human bodies produced by extensive application of fossil energy, such as $SO_2$—CO—$NO_x$, and to global climate changes caused by the greenhouse effect due to considerable quantity of exhausted $CO_2$, the world is devoted to the development of new energy technologies. In particular, hydrogen energy is planned to be one of the major energies in the future by the International Energy Agency (IEA), because the byproduct thereof is water only, without $CO_2$, which completely prevents pollution and the greenhouse effect. However, in practical applications, due to the light molecular weight of hydrogen, the storage volume will be immensely huge. Though super-high pressure can be adopted for storage, safety will be another issue.

The problems of storage density and safety of hydrogen are not solved until 1980 when the hydrogen storage alloys that can stores hydrogen in solid state is introduced. Nevertheless, the hydrogen storage density of current commercial hydrogen storage alloys, including transition-metal-based hydrogen storage alloys $AB_2$ or rare-earth-metal-based hydrogen storage alloys $AB_5$, is still too low, less than 2.0% in weight. Thereby, the research and development of high-capacity hydrogen storage alloys is the current international trend. Particularly, magnesium-based hydrogen storage alloys are regarded as potential hydrogen storage alloys due to their low costs in raw materials. However, because pure magnesium is very active, the surface thereof tends to form an oxidation layer that can block absorption of hydrogen molecules, and hence affect diffusion rate of hydrogen atoms on the surface of alloys. As a result, pure magnesium is difficult to be activated and has bad hydrogen absorption-desorption dynamics. In addition, the temperatures of hydrogen absorption and desorption are too high. Accordingly, it cannot be developed to be a practical hydrogen storage alloy.

Regarding to the issue of bad hydrogen absorption-desorption dynamics of pure magnesium, by many researches, it is discovered that by adding nickel with catalyzing effect, the reaction rate of hydrogen absorption-desorption in the hydrogen storage alloy Mg—Ni can be improved, and the initial activation properties is catalyzed as well. In the Mg—Ni-based hydrogen storage alloys, Mg$_2$Ni in the γ-phase has the fastest activation reaction rate and the best hydrogen absorption-desorption property.

Because the melting points of magnesium (649° C.) and nickel (1455° C.) differ greatly, melting tends to be ununiform, which would result in ununiformity in composition of the hydrogen storage alloy. In addition, the vapor pressure of magnesium is high, thereby magnesium is easy to vaporize during melting, which causes severe deviation in initial composition, and excess eutectic structure and formation of the β-phase MgNi$_2$, which is incapable of absorbing hydrogen. In order to solve the problem the severe deviation in composition during melting as described above, next-generation vacuum induction furnaces are introduced. However, although the vacuum induction furnaces are equipped with in-situ inspection, for the hydrogen storage alloy Mg—Ni, owing to its natural characteristic in the phase diagram, the melt liquid of Mg—Ni still cannot give 100%-pure γ-phase Mg$_2$Ni after solidification, even the composition of magnesium and nickel are controlled to be accurately 2:1 via the most precise in-situ inspection function. This is because according to the binary equilibrium phase diagram of magnesium and nickel, in such a composition, far above the melting point 761° C. of the γ-phase Mg$_2$Ni, the β-phase MgNi$_2$, which has a meting point of 1147° C. and is incapable of absorbing hydrogen, has solidified and precipitated first. Besides, because the composition of the β-phase MgNi$_2$ has much more nickel than the γ-phase Mg$_2$Ni, the residual Mg—Ni melt liquid yet solidified deviates from the original composition of the γ-phase Mg$_2$Ni with a magnesium-to-nickel atomic ratio of 2:1, and becomes a magnesium-rich state. The Mg—Ni melt liquid in the magnesium-rich state, according to the binary equilibrium phase diagram of magnesium and nickel, not only will form the γ-phase Mg$_2$Ni if the temperature is lower than 761° C. in the present composition, but also will give an eutectic structure including the pure-magnesium phase at the eutectic temperature of 507° C. That is to say, even the macroscopic composition complies with the proportion of the γ phase, the microscopic structure thereof includes the β-phase MgNi$_2$ and the solid solution phase of pure-magnesium in the γ-phase Mg$_2$Ni. Thereby, the smelt method according to the prior art cannot be used for preparing high-purity hydrogen storage alloy Mg$_2$Ni with fast activation reaction rate and with excellent hydrogen absorption and desorption properties.

Accordingly, the authors of the present invention make advantage of the segregation principle in physical metallurgy, in a broad range of composition and in low temperatures (far lower than the melting point of pure nickel), and propose a simple apparatus for continuously manufacturing high-purity hydrogen storage alloy Mg$_2$Ni.

SUMMARY

An objective of the present invention is to provide a method and apparatus for manufacturing high-purity magnesium-nickel hydrogen storage alloy without the need of precisely controlling the composition of magnesium and nickel in the magnesium-nickel alloy.

Another objective of the present invention is to provide a method and apparatus for manufacturing high-purity magnesium-nickel hydrogen storage alloy, which can recycle the residual magnesium-rich liquid after the precipitation reaction and continuously manufacture high-purity magnesium-nickel hydrogen storage alloy according to the method provided by the present invention.

In order to achieve the objectives described above, the present invention provides a method and apparatus for manufacturing high-purity magnesium-nickel hydrogen storage alloy. The apparatus comprises a vacuum chamber with a material feeding tube, a first crucible, a heating device, a stirring device, and a second crucible. First, put the raw material of pure magnesium into the first crucible, and place the first crucible into the vacuum chamber gassed with an inert gas. Then, use the heating device to heat the magnesium raw material until it melts completely into a magnesium liquid. Next, use the material feeding tube to add slowly pure nickel powders to the first crucible with the magnesium liquid, and use the stirring device to stir unceasingly while using the heating device to heat up, so that the nickel powders are melt completely and mixed with the magnesium liquid to become a uniform magnesium-nickel liquid. It is not necessary for the apparatus and method according to the present invention to install delicate in-situ inspection, nor to control precisely the composition of the magnesium-nickel liquid. It is only required that the weight percentage of the amount of the added nickel to the whole magnesium-nickel melt is between 23.5 and 50.2, then it is guaranteed to give pure γ-phase $Mg_2Ni$ hydrogen storage alloy with composition of Mg-54.6 wt % Ni (that is, the atomic ratio between magnesium and nickel is 2:1) without other phases.

The next step is to control the heating temperature of the heating device to be within a temperature range, which is between 507° C. and 761° C. According to the segregation principle of physical metallurgy and to the Mg—Ni phase diagram, high-purity magnesium-nickel hydrogen storage alloy will be formed and precipitated automatically, and the purity thereof is independent of the precipitation temperature within said temperature range. Thereby, according to the present invention, it is not necessary to adopt accurate and costly temperature control systems. In addition, the precipitated quantity (weight) of the hydrogen storage alloy $Mg_2Ni$ depends on the composition of the magnesium-nickel liquid and the precipitation temperature. In general, within the broad ranges of composition and temperature conditions according to the present invention, the higher the proportion of nickel and the lower the precipitation temperature, the more the precipitated quantity of high-purity γ-phase $Mg_2Ni$. The exact precipitated quantity (weight) can be calculated according to the level rule of phase diagram in physical metallurgy.

Because the nickel composition (54.6 wt %) of the precipitated high-purity γ-phase $Mg_2Ni$ according to the present invention is higher than that of the original magnesium-nickel composition (that is, the weight percentage of nickel is between 23.5 and 50.2), with the progress of precipitation reaction, according to the law of conservation of mass, the composition of the residual magnesium-nickel liquid will become more and more magnesium-rich. The density of nickel (8.9 $g/cm^3$) is much greater than that of magnesium (1.74 $g/cm^3$), therefore, the precipitated high-purity magnesium-nickel hydrogen storage alloy will sink at the bottom of the crucible given that the density of solid-state magnesium-nickel hydrogen storage alloy is much greater than the specific weight of the magnesium-nickel liquid. Thereby, pour the residual liquid in the first crucible after the precipitation reaction into the second crucible, draw out the first crucible loaded with the precipitated magnesium-nickel hydrogen storage alloy from the heating device, and cool the first crucible. After cooling, pick out the magnesium-nickel hydrogen storage alloy from the first crucible, and repeat the procedure described above for the second crucible loaded with the residual liquid. Then high-purity magnesium-nickel hydrogen storage alloy is given continuously.

DETAILED DESCRIPTION

In order to make the structure and characteristics as well as the effectiveness of the present invention to be further understood and recognized, the detailed description of the present invention is provided as follows along with preferred embodiments and accompanying figures.

Figure 1:
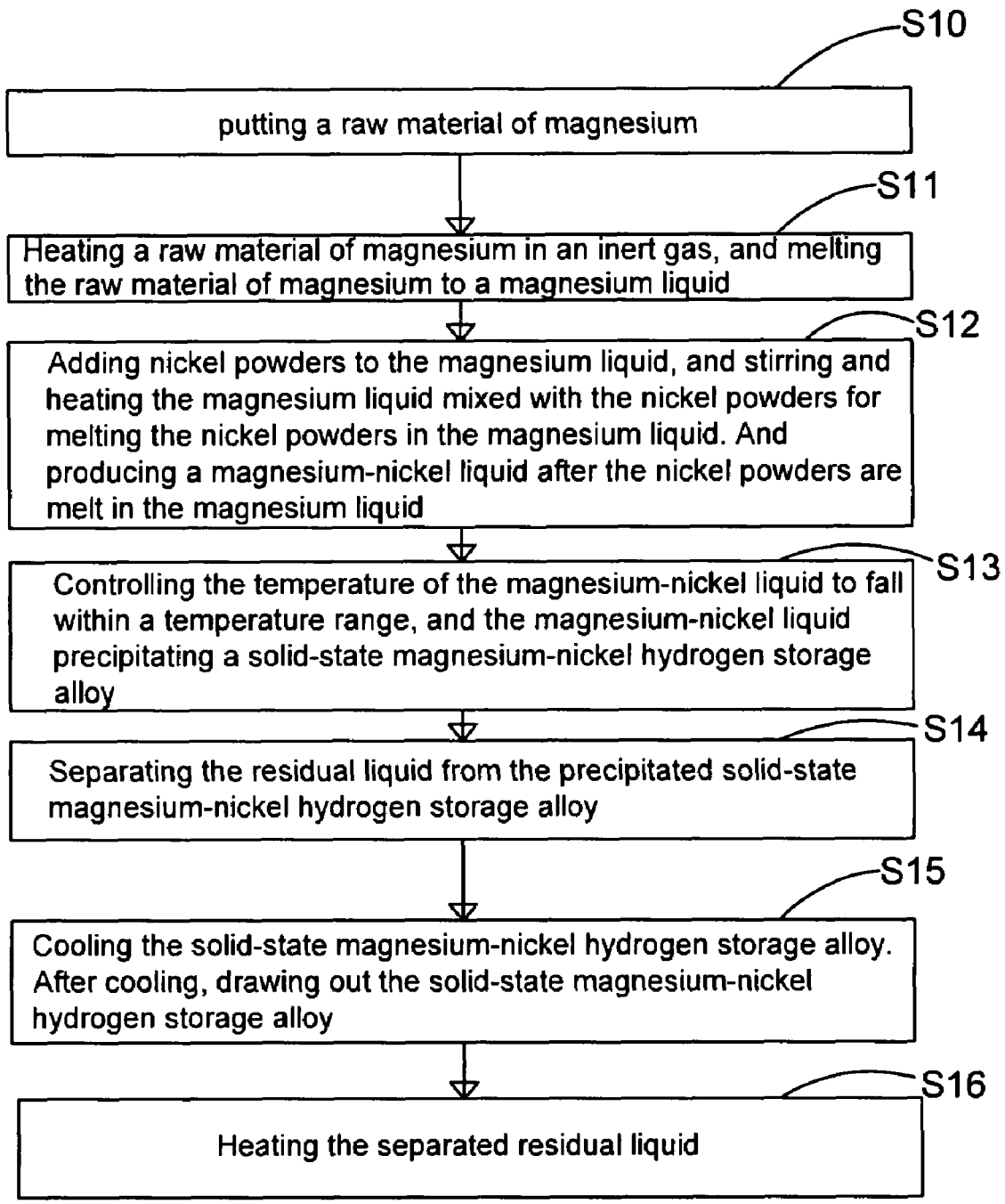
FIG. 1 shows a flowchart according to a preferred embodiment of the present invention.
Figure 2A:
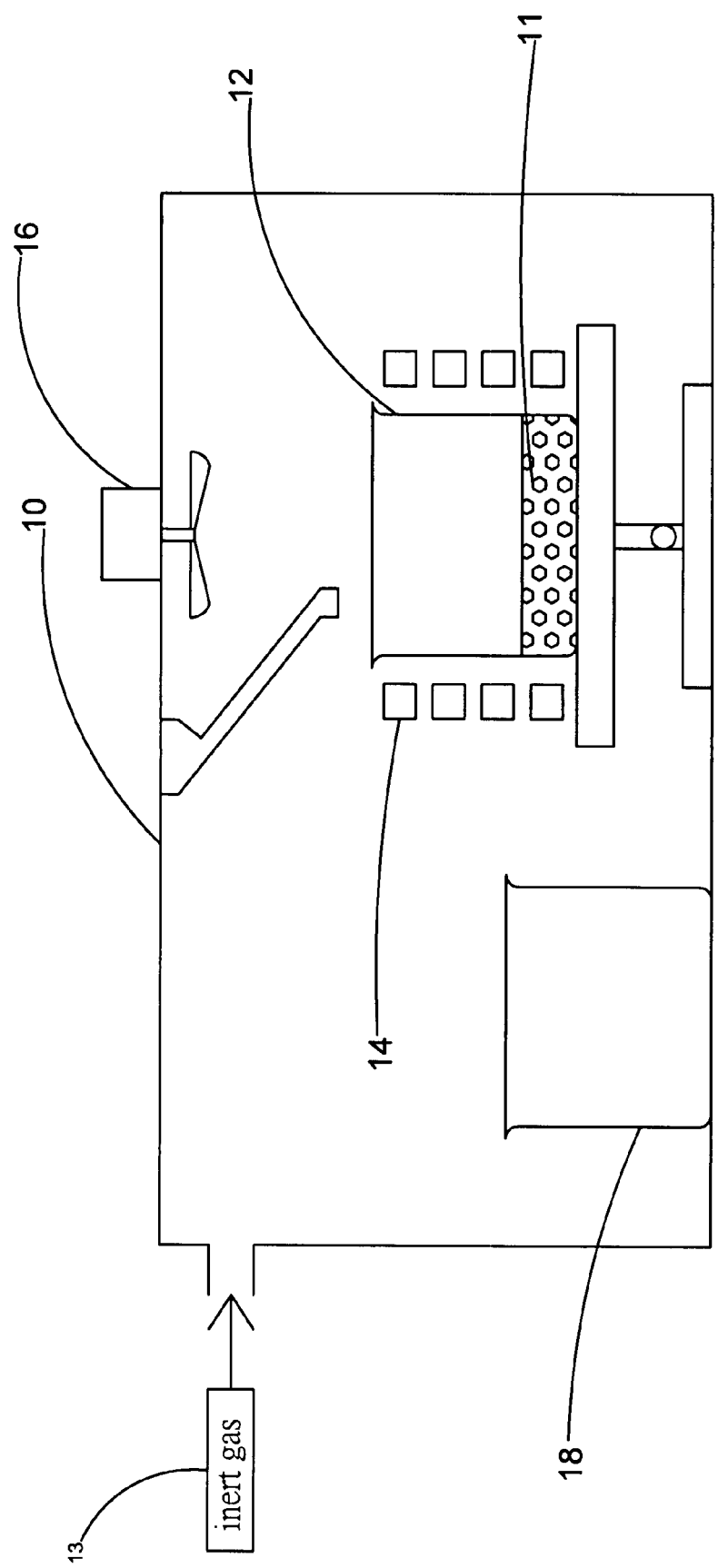
FIG. 2A shows a schematic diagram of the apparatus in the steps S10 and S11 according to a preferred embodiment of the present invention.

FIG. 1 and FIG. 2A show a flowchart and a schematic diagram of the apparatus in the steps S10 and S11 according to a preferred embodiment of the present invention. As shown in the figure, the present invention provides a method and apparatus for manufacturing high-purity magnesium-nickel hydrogen storage alloy. The apparatus comprises a vacuum chamber 10 with a material feeding tube 104, a first crucible 12, a heating device 14, a stirring device 16, and a second crucible 18. By using the apparatus, the step S10 is executed for putting a raw material of magnesium 11 into the first crucible 12, where the raw material of magnesium 11 is a magnesium metal bulk, and the material of the first crucible 12 is a metal material with melting point greater than that of the magnesium metal. Then, gas an inert gas 13 into the vacuum chamber 10, and put the first crucible 12 with the raw material of magnesium 11 into the vacuum chamber 10. Before gassing the inert gas 13 into the vacuum chamber 10, the inert gas 13 is first used to purge the vacuum chamber 10. Finally, seal the vacuum chamber 10, and let the inert gas 13 be maintained in the vacuum chamber 10. After the first crucible 11 loaded with the raw material of magnesium 11 is put into the vacuum chamber 10, the step S11 is executed for setting the first crucible 12 in the heating device 14, which is used for heating the raw material of magnesium 11 in the first crucible 12 to be totally melt and become a magnesium liquid 110. The heating device 14 is a resistive heater with a temperature adjustment function.

Figure 2B:
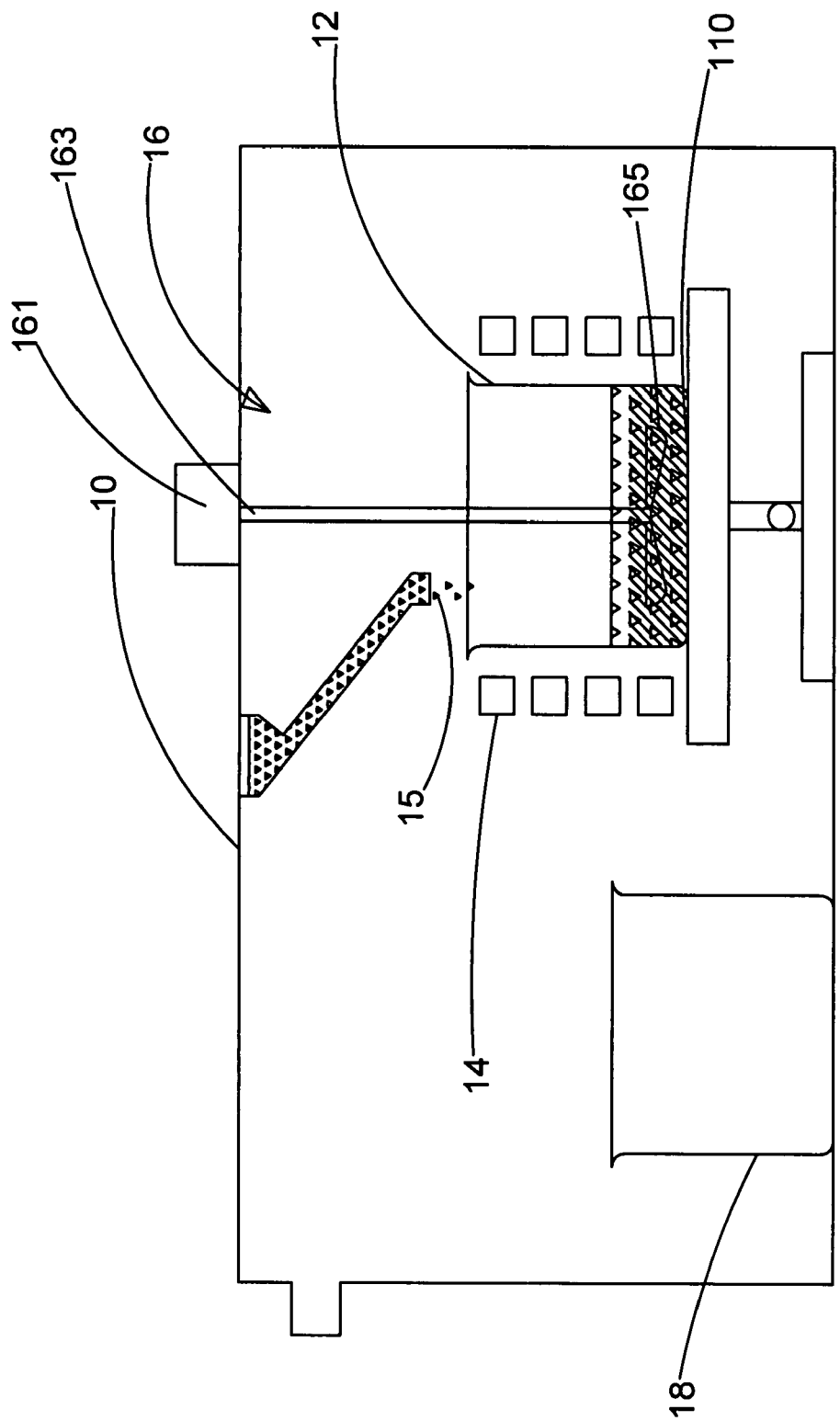
FIG. 2B shows a schematic diagram of the apparatus in the step S12 according to a preferred embodiment of the present invention.

FIG. 2B shows a schematic diagram of the apparatus in the step S12 according to a preferred embodiment of the present invention. As shown in the figure, after the raw material of magnesium 11 in the first crucible 12 is melt into the magnesium liquid 110, the step S12 is executed for adding nickel powders 15 slowly to the magnesium liquid 110 in the first crucible 12 by using the material feeding tube 104, and stirring the magnesium liquid 110 and the nickel powders 15 loaded in the first crucible 12 by using the stirring device 16. Besides, the heating device 14 is used for heating the first crucible 12 with the magnesium liquid 110 and the nickel powders 15 so that the temperature of the magnesium liquid 110 is heated above 770° C. Thereby, the nickel powders 155 are melt completely in the magnesium liquid 110 and a uniformly mixed magnesium-nickel liquid 112 is produced. The stirring device 16 includes a motor 161 and a paddle 163. In addition, the stirring device 16 can be elevated. When the stirring device 16 is used for stirring, the paddle 163 can elevated to a proper position, and the motor 161 will drive the paddle 163 for stirring. Furthermore, an oar-shaped blade 165 is adapted on one end of the paddle 163 for increasing stirring area and speed. When stirring is performed, the paddle 163 of the stirring device 16 is retracted. The weight percentage of the nickel element in the magnesium-nickel liquid 112 is between 23.5% and 50.2%, which represents the composition of the added nickel powders. Thereby, the composition ratio of the magnesium and nickel elements in the final precipitated high-purity solid-state magnesium-nickel hydrogen storage alloy is 2:1 without other phases.

Figure 2C:
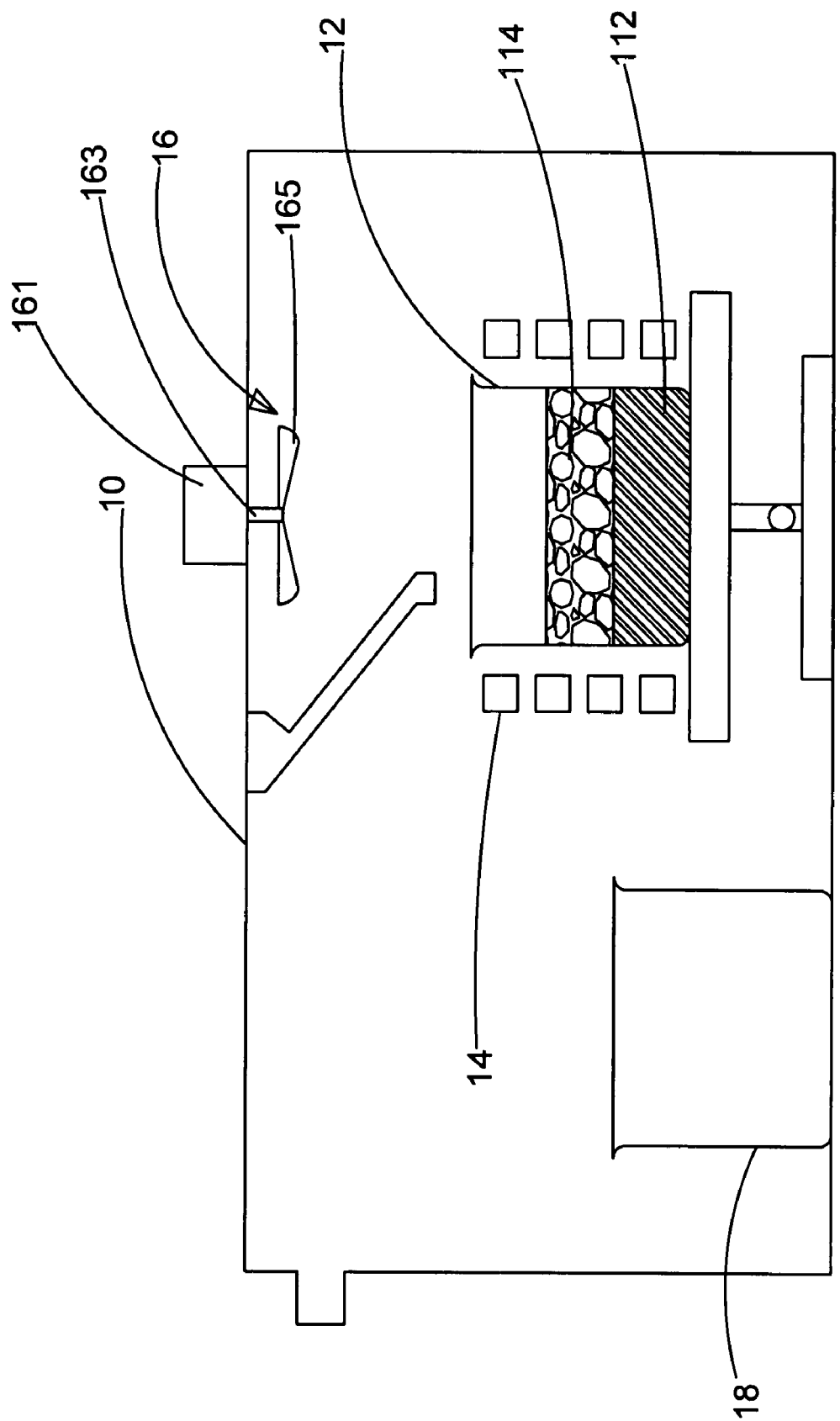
FIG. 2C shows a schematic diagram of the apparatus in the step S13 according to a preferred embodiment of the present invention.

FIG. 2C shows a schematic diagram of the apparatus in the step S13 according to a preferred embodiment of the present invention. As shown in the figure, when the magnesium-nickel liquid 112 is produced, the step S13 is executed for controlling the temperature of the heating device 14 to fall within a temperature range. Thereby, the temperature of the magnesium-nickel liquid 112 will be within the temperature range, which is above the solidification temperature and below the liquification temperature of the magnesium-nickel liquid 112. That is, between 507° C. and 761° C. According to the segregation principle of physical metallurgy and to the Mg—Ni phase diagram, high-purity magnesium-nickel hydrogen storage alloy 114 will be formed and precipitated from the magnesium-nickel liquid 112 automatically, and the purity thereof is independent of the precipitation temperature within said temperature range. Thereby, according to the present invention, it is not necessary to adopt accurate and costly temperature control systems. In addition, the precipitated quantity (weight) of the hydrogen storage alloy 114 depends on the composition of the magnesium-nickel liquid and the precipitation temperature. In general, within the broad ranges of composition and temperature conditions according to the present invention, the higher the proportion of nickel and the lower the precipitation temperature, the more the precipitated quantity of high-purity magnesium-nickel hydrogen storage alloy 114. The exact precipitated quantity (weight) can be calculated according to the level rule of phase diagram in physical metallurgy.

Figure 2D:
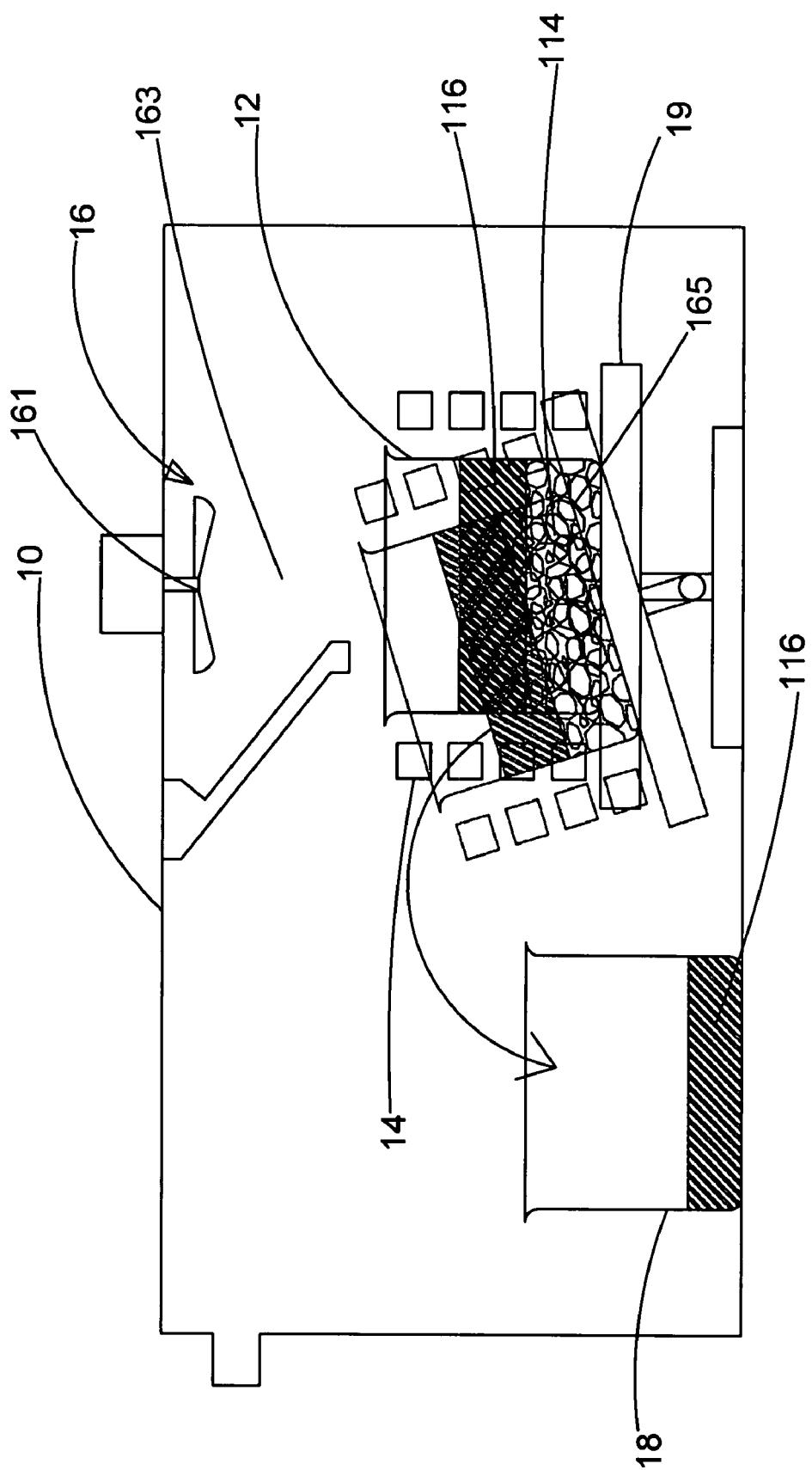
FIG. 2D shows a schematic diagram of the apparatus in the step S14 according to a preferred embodiment of the present invention.

FIG. 2D shows a schematic diagram of the apparatus in the step S14 according to a preferred embodiment of the present invention. As shown in the figure, the solid-state magnesium-nickel hydrogen storage alloy 114 is precipitated from the magnesium-nickel liquid 112. The nickel composition of the magnesium-nickel hydrogen storage alloy 114 is greater than that in the magnesium-nickel liquid 112. With the progress of precipitation reaction, according to the law of conservation of mass, the composition of the residual magnesium-nickel liquid 116 will become magnesium-rich. The density of nickel (8.9 g/cm$^3$) is much greater than that of magnesium (1.74 g/cm$^3$), therefore, the solid-state magnesium-nickel hydrogen storage alloy 114 will sink at the bottom of the first crucible 12. After the magnesium-nickel liquid 112 precipitated the solid-state magnesium-nickel hydrogen storage alloy 114, the step S14 is executed for separating the residual liquid 116 in the first crucible 12 from the solid-state magnesium-nickel hydrogen storage alloy 114 suck at the bottom of the first crucible 12 by pouring the residual liquid 116 in the first crucible 12 into the second crucible 18. In order to pour the residual liquid 116 in the first crucible 12 into the second crucible 18 easily, an inclinable base 19 is adapted in the vacuum chamber 10 with the first crucible 12 and the heating device 14 set thereon. When the base 19 inclines, the first crucible 12 and the heating device 14 incline with the base 19, and the residual liquid 116 will be poured into the second crucible 18. Finally, the solid-state magnesium-nickel hydrogen storage alloy 114 will be left at the bottom of the first crucible 12.

Figure 2E:
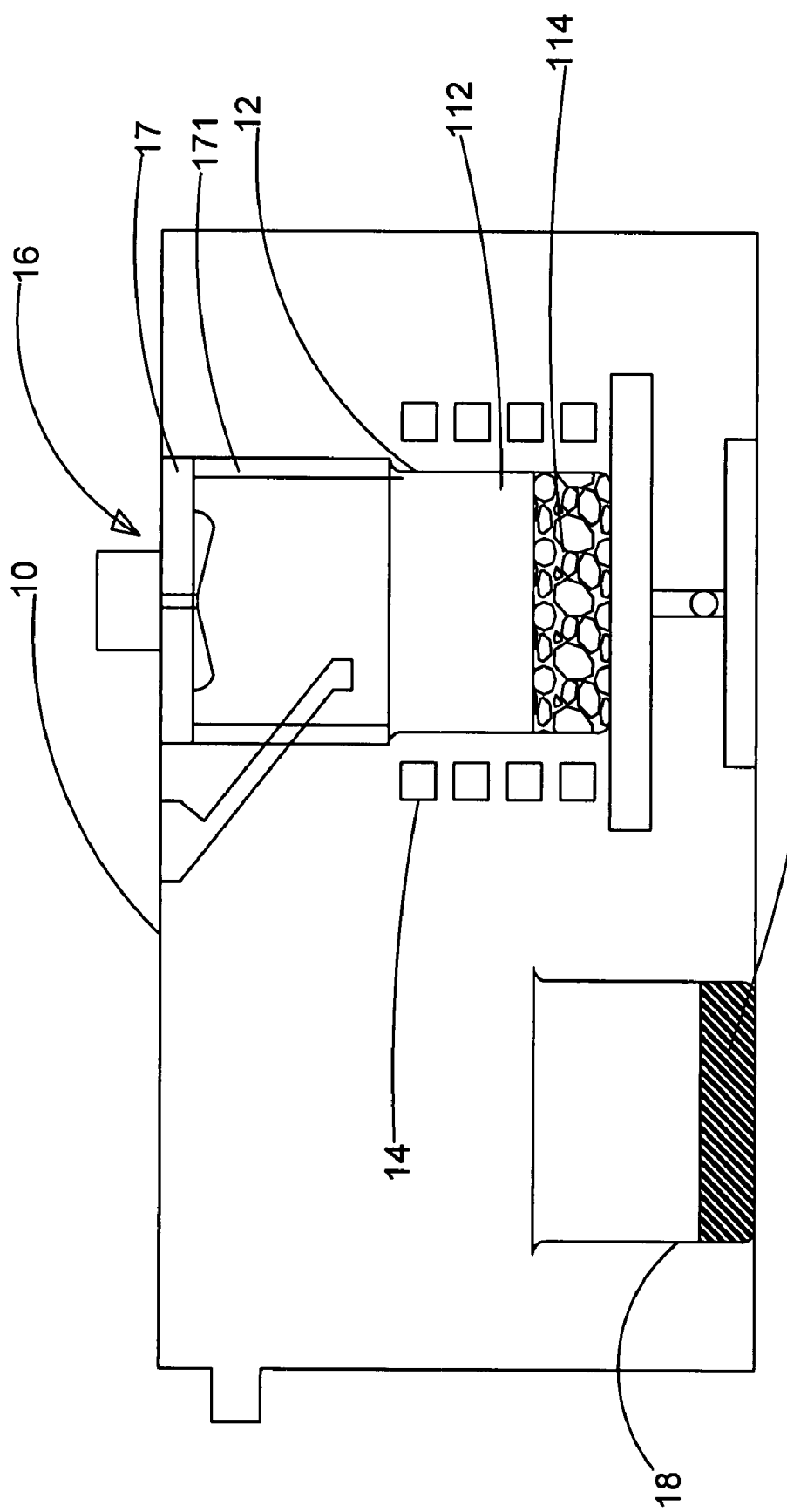
FIG. 2E shows a schematic diagram of the apparatus in the step S15 according to a preferred embodiment of the present invention.

FIG. 2E shows a schematic diagram of the apparatus in the step S15 according to a preferred embodiment of the present invention. As shown in the figure, the step S15 is executed. Draw out the first crucible 12 from the heating device 14, and cool the first crucible 12 loaded with the solid-state magnesium-nickel hydrogen storage alloy 114. In or to draw out the first crucible 12 from the heating device 14 conveniently, a hoist mechanism 17 is further adapted in the vacuum chamber 10. The hoist mechanism 17 includes a plurality of twisted ropes 171, which is fixed on the first crucible 12. Thereby, the hoist mechanism 17 can draw out the first crucible 12 from the heating device 14. In addition, in order to secure the connection between the hoist mechanism 17 and the first crucible 12, a plurality of hanging ears (not shown in the figure) is adapted at the periphery of the opening of the first crucible 12. A hanging hook (not shown in the figure) is adapted on one end of the plurality of twisted ropes 171 of the hoist mechanism 17, respectively. Thereby, the hanging hooks are hooked on the plurality of hanging ears of the first crucible 12. Thus, the connection between the hoist mechanism 17 and the first crucible 12 is secured.

Figure 2F:
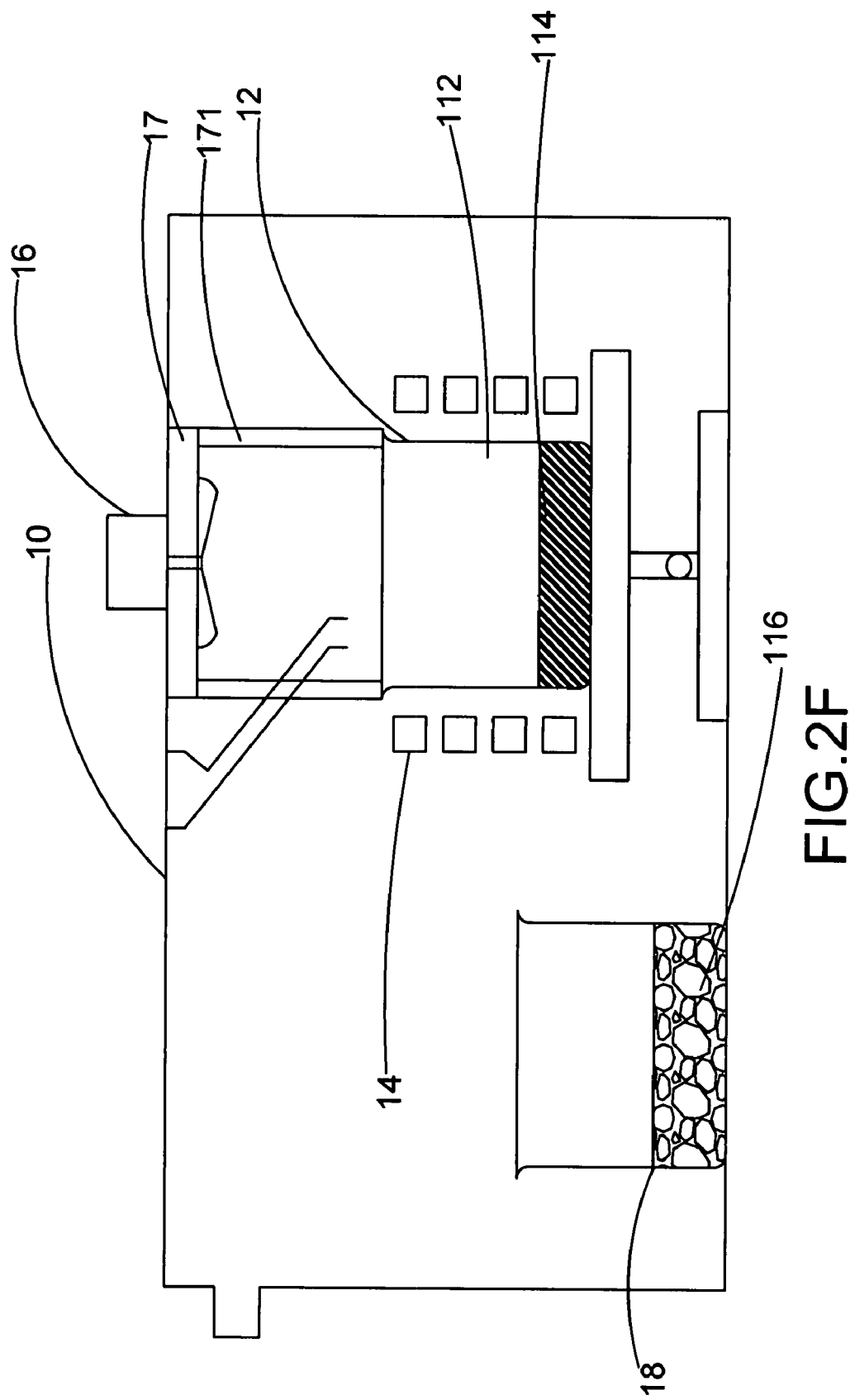
FIG. 2F shows a schematic diagram of the apparatus in the step S16 according to a preferred embodiment of the present invention.

Another significant technological breakthrough of the present invention is to recycle the residual liquid, and thereby a method and apparatus for continuously manufacturing high-purity magnesium-nickel hydrogen storage alloy is developed. FIG. 2F shows a schematic diagram of the apparatus in the step S16 according to a preferred embodiment of the present invention. As shown in the figure, after the first crucible 12 is drawn out from the heating device 14, the step S16 is executed for putting the second crucible 18 loaded with the residual liquid 116 into the heating device 14 by using the hoist mechanism 17. Then, the steps S10 through S16 are executed repeatedly for continuously manufacturing high-purity magnesium-nickel hydrogen storage alloy 114. The first and the second crucibles 12, 18 are used alternately owing to continuous manufacturing.

While manufacturing continuously, the second and thereafter manufacturing cycles differ from the first manufacturing cycle in that, in the second and thereafter manufacturing cycles, in order to increase productivity of high-purity magnesium-nickel hydrogen storage alloy 114, the amount of added nickel powders can be increased from the preset range of 23.5% and 50.2% up to 54.6%. The condition still gives high-purity magnesium-nickel hydrogen storage alloy 114 without other phases. Because the residual liquid 116 is a magnesium-rich liquid, which is an excellent composition adjuster, the nickel composition of the magnesium-nickel liquid 112 can be maintained within the range of 20 to 55 wt % without precise and accurate control of chemical composition.

Figure 3:
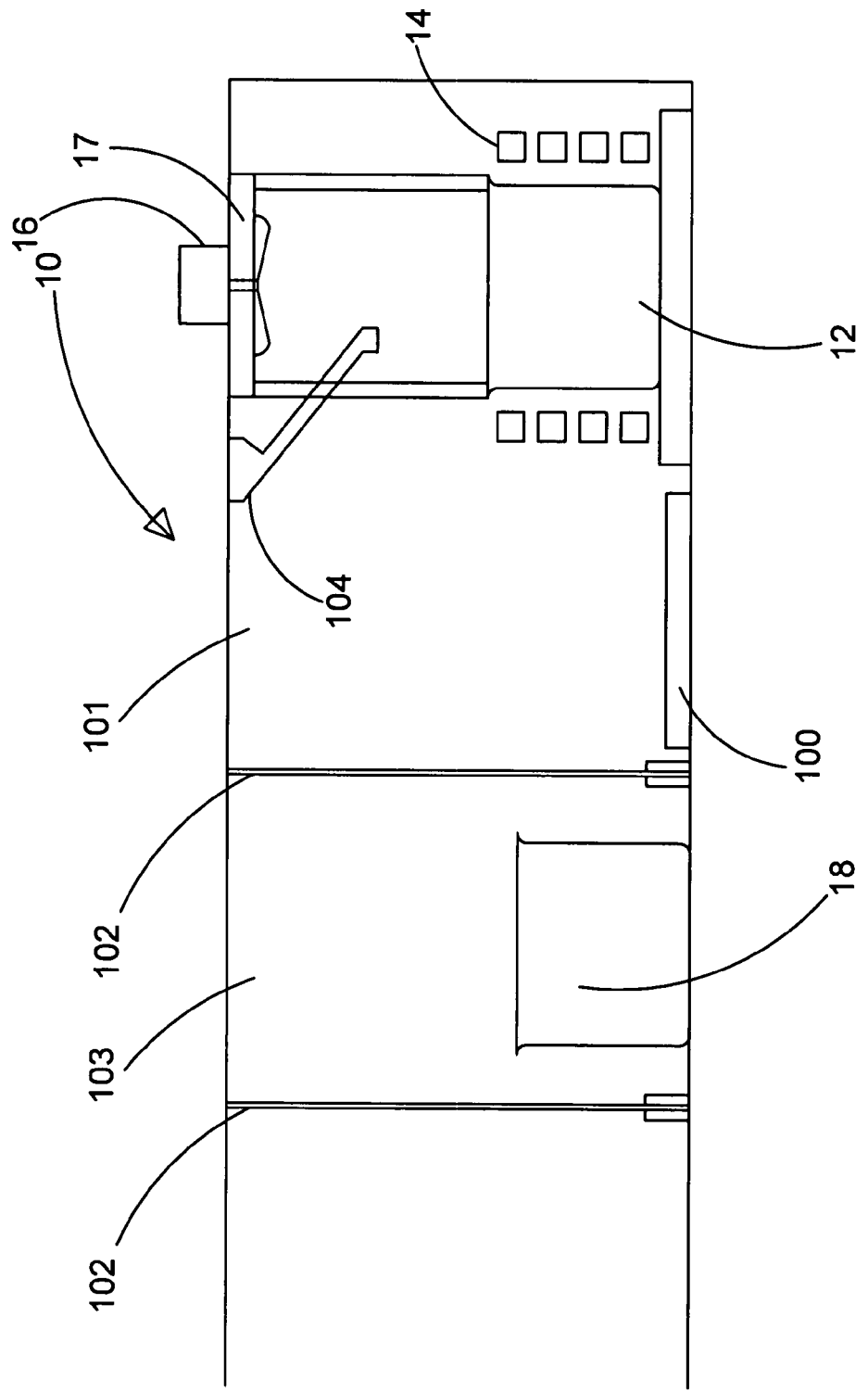
FIG. 3 shows a schematic diagram of the apparatus according to another preferred embodiment of the present invention.

FIG. 3 shows a schematic diagram of the apparatus according to another preferred embodiment of the present invention. As shown in the figure, the present invention provides an apparatus for manufacturing high-purity magnesium-nickel alloy and comprising a vacuum chamber 10, a first crucible 12, a heating device 14, a stirring device 16, a second crucible 18, a hoist mechanism 17, a water-cooled copper base 100 with recycling cooling water, and a material feeding tube 104. The vacuum chamber 10 according to the present preferred embodiment is divided into a precipitation chamber 101 and a crucible in/out chamber 103. One or more isolation valves 102 are adapted between the precipitation chamber 101 and the crucible in/out chamber 103, so that the precipitation chamber 101 can be maintain in vacuum or in the inert gas no matter separation or crucible in/out is undergoing.

The first crucible 12, the heating device 14, the stirring device 16, the hoist mechanism 17, the water-cooled copper base 100, and the material feeding tube 104 are set in the precipitation chamber 101 of the vacuum chamber 10. The first crucible is set on the heating device 14. The stirring device is set on top of precipitation chamber 101 of the vacuum chamber 10, and facing the first crucible 12. The hoist mechanism 17 is also set on top of precipitation chamber 101 of the vacuum chamber 10. The water-cooled copper base 100 is set on one side of the first crucible 12. The material feeding tube 104 penetrates the vacuum chamber 10.

According to the present invention, place a raw material of magnesium to the first crucible 12 on the crucible in/out chamber 103 of the vacuum chamber 10, and gas an inert gas to the vacuum chamber 10. Use the hoist mechanism 17 to put the first crucible 12 loaded with the raw material of magnesium to the precipitation chamber 101 filled with the inert gas and into the heating device 14. The heating device 14 heats the first crucible 12 loaded with the raw material of magnesium, melts the raw material of magnesium to a magnesium liquid. Then, through the material feeding tube 104 penetrating the vacuum chamber 10, nickel powders are added into the first crucible 12 loaded with the magnesium liquid. By using the heating device 14, the first crucible 12 loaded with the nickel powders and the magnesium liquid. Besides, the stirring device 16 is used for stirring, so that the nickel powders are melt in the magnesium liquid to produce a magnesium-nickel liquid. Next, control the temperate of the heating device 14 to fall within a temperature range for the magnesium-nickel liquid to precipitate a solid-state magnesium-nickel hydrogen storage alloy. Finally, separate the residual liquid in the first crucible from the precipitated solid-state magnesium-nickel hydrogen storage alloy. First, place a raw material of magnesium in the second crucible 18 and put it to the precipitation chamber 101 of the vacuum chamber 10. Use the hoist mechanism 17, which is capable of inclining, to put the first crucible 12 loaded with residual liquid to the second crucible 18, and put the first crucible 12 on the water-cooled copper base 100 in the precipitation chamber 101. The water-cooled copper base 100 cools the solid-state magnesium-nickel hydrogen storage alloy in the first crucible 12. After cooling, use the hoist mechanism 17 to pick the first crucible 12 out, and take the solid-state magnesium-nickel hydrogen storage alloy from the first crucible 12. The water-cooled copper base 100 is adapted in the precipitation chamber 101. Because the activity of magnesium-nickel hydrogen storage alloy is very high, it tends to react with oxygen or even ignite, deteriorating its characteristics and producing dangers, it is necessary to cool sufficiently before drawing out from the precipitation chamber 101 in vacuum or filled with the inert gas. In mass production, for example, smelt above hundreds of kilograms or tons, the cooling rate of nature cooling is insufficient, and thus limiting the production efficiency. Thereby, the water-cooled copper base is equipped in the precipitation chamber 101. By taking advantage of the excellent heat-sinking characteristic of copper, the first crucible loaded with high-purity solid-state magnesium-nickel hydrogen storage alloy can be quenched rapidly.

To sum up, the present invention provides a method and apparatus for manufacturing high-purity magnesium-nickel hydrogen storage alloy, which can be used for manufacturing high-purity magnesium-nickel hydrogen storage alloy with superior hydrogen absorption-desorption dynamics without the need of adopting costly and delicate equipments. In addition, the residual liquid after precipitation reaction can be recycled and high-purity magnesium-nickel hydrogen storage alloy with superior hydrogen absorption-desorption dynamics can be manufactured continuously.

Accordingly, the present invention conforms to the legal requirements owing to its novelty, non-obviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A method for manufacturing high-purity magnesium-nickel hydrogen storage alloy, comprising steps of:
    heating a raw material of magnesium in an inert gas, and melting the raw material of magnesium to a magnesium liquid;
    adding nickel powders to the magnesium liquid, and stirring and heating the magnesium liquid mixed with the nickel powders for melting the nickel powders in the magnesium liquid;
    producing a magnesium-nickel liquid after the nickel powders are melted in the magnesium liquid;
    controlling the temperature of the magnesium-nickel liquid to fall within a temperature range, and the magnesium-nickel liquid precipitating a solid-state magnesium-nickel hydrogen storage alloy; and
    separating the residual liquid from the precipitated solid-state magnesium-nickel hydrogen storage alloy, and producing the solid-state magnesium-nickel hydrogen storage alloy, and recovering a separated residual liquid.

2. The method of claim 1, wherein the step of separating the residual liquid from the precipitated solid-state magnesium-nickel hydrogen storage alloy further comprises cooling the solid-state magnesium-nickel hydrogen storage alloy.

3. The method of claim 1, wherein the composition ratio of the magnesium and nickel elements in the solid-state magnesium-nickel hydrogen storage alloy is 2:1.

4. The method of claim 1, and further comprising a step of heating the separated residual liquid, and repeating the steps of heating a raw material of magnesium in an inert gas, and melting the raw material of magnesium to a magnesium liquid, adding nickel powders to the magnesium liquid, and stirring and heating the magnesium liquid mixed with the nickel powders for melting the nickel powders in the magnesium liquid, producing a magnesium-nickel liquid after the nickel powders are melted in the magnesium liquid, controlling the temperature of the magnesium-nickel liquid to fall within a temperature range, and the magnesium-nickel liquid precipitating a solid-state magnesium-nickel hydrogen storage alloy, and separating the residual liquid from the precipitated solid-state magnesium-nickel hydrogen storage alloy, and giving the solid-state magnesium-nickel hydrogen storage alloy, for continuously producing the solid-state magnesium-nickel hydrogen storage alloy.

5. The method of claim 1, wherein the raw material of magnesium is a magnesium metal bulk.

6. The method of claim 1, wherein the weight percentage of the nickel element in the magnesium-nickel liquid is between 23.5% and 50.2%.

7. The method of claim 1, wherein the temperature range is between 507° C. and 761° C.

8. The method of claim 1, wherein the residual liquid is a magnesium-rich liquid.

* * * * *